Feb. 5, 1946.　　　R. O. ANDERSON ET AL　　　2,393,948
AERIAL PICK-UP DEVICE
Filed Dec. 20, 1943　　　3 Sheets-Sheet 2
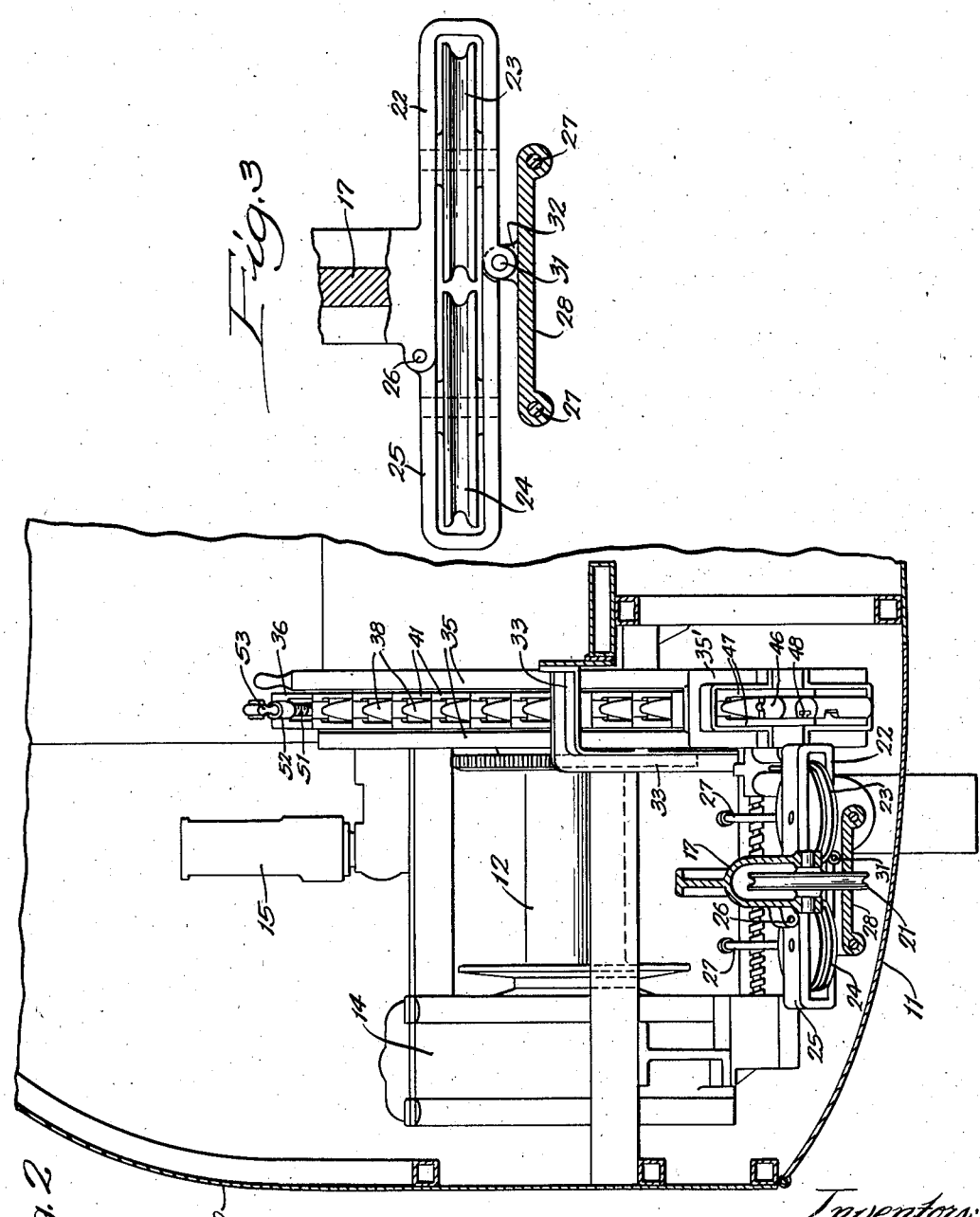

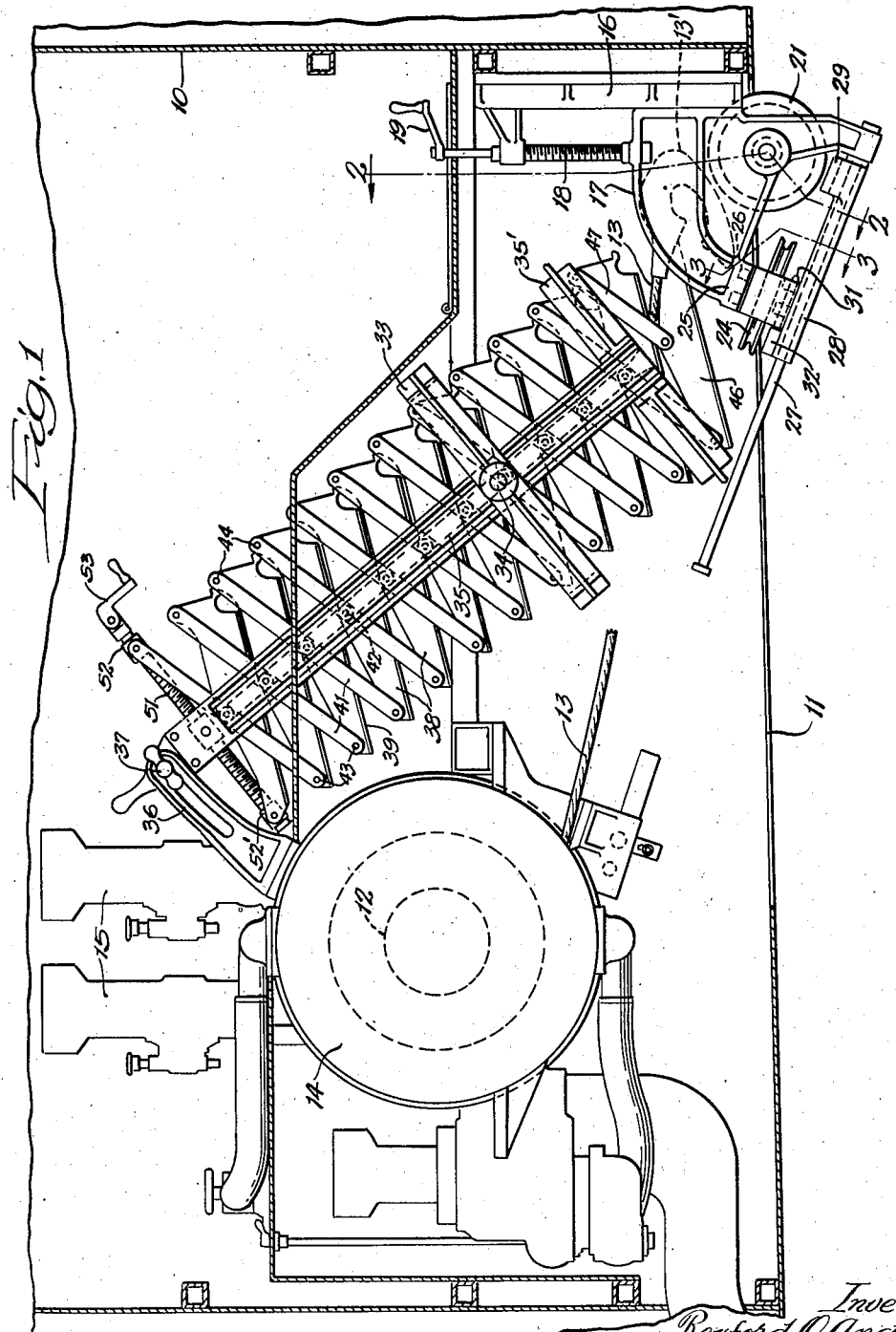

Feb. 5, 1946.  R. O. ANDERSON ET AL  2,393,948
AERIAL PICK-UP DEVICE
Filed Dec. 20, 1943    3 Sheets-Sheet 3
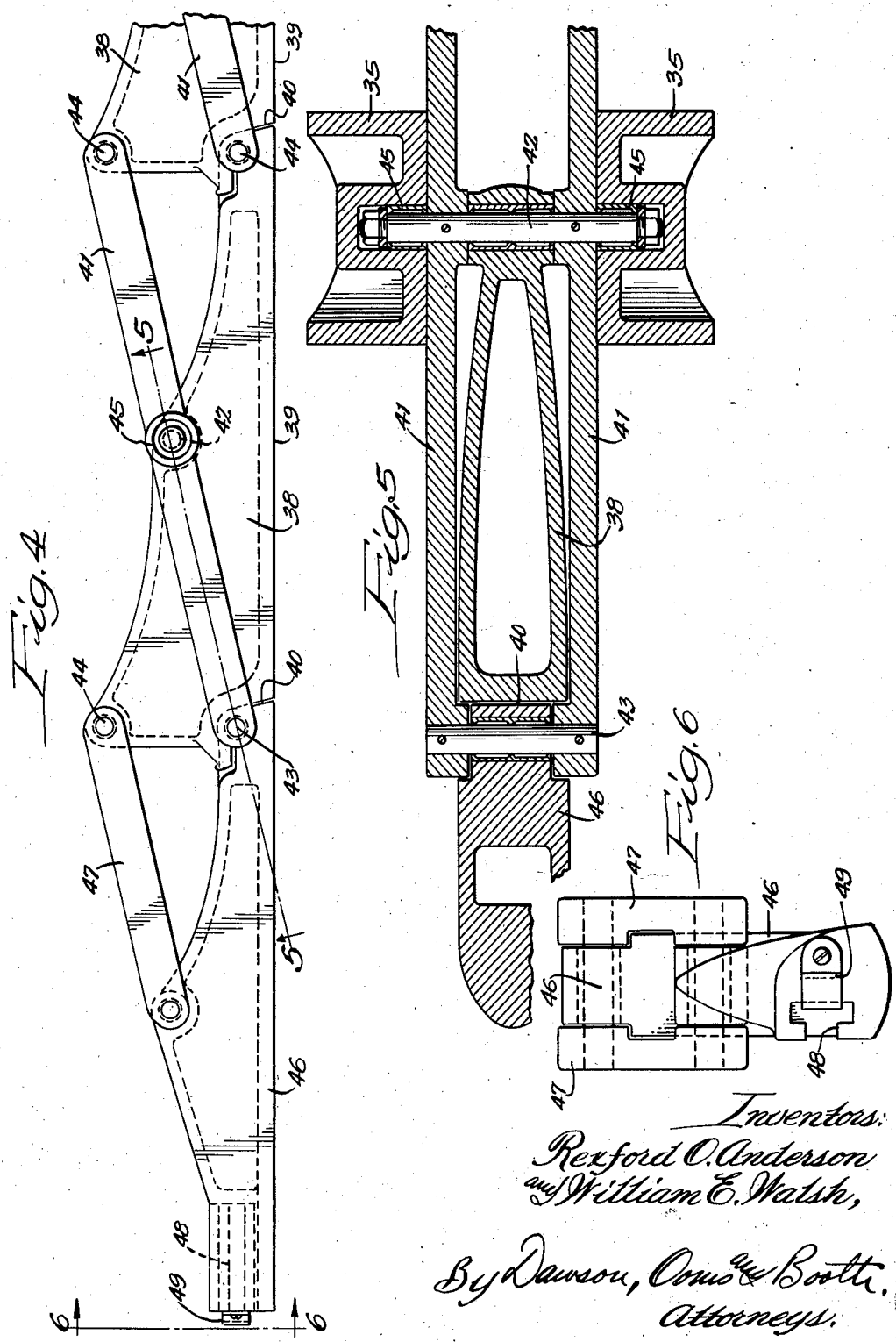

Patented Feb. 5, 1946

2,393,948

UNITED STATES PATENT OFFICE 2,393,948

AERIAL PICKUP DEVICE

Rexford O. Anderson and William E. Walsh, Chicago, Ill., assignors to Foote Bros. Gear and Machine Corporation, Chicago, Ill., a corporation of Delaware Application December 20, 1943, Serial No. 515,001

11 Claims. (Cl. 258—1.2)

This invention relates to aerial pickup devices and more particularly to hook supporting and cable guide mechanism adapted to be mounted in an aircraft.

One of the objects of the invention is to provide a mechanism which can be completely enclosed in the aircraft when not in use and which can be extended through a relatively small opening in the aircraft for picking up or towing a load.

Another object of the invention is to provide a cable guide structure in which the cable is held against accidental displacement during operation but from which the cable can easily be released when desired. According to one important feature the guide structure is automatically operated to release the cable by a hook or the like thereon when cable is being wound in.

Still another object of the invention is to provide an extensible linkage whose angular position in the aircraft can be adjusted. Preferably, the linkage is carried on a frame which is pivotally mounted in the aircraft.

A further object is to provide an extensible linkage which is supported and guided throughout a portion of its length. In one desirable construction rollers on the linkage are received in elongated guide channels so that any desired part of the linkage may be rigidly supported.

A still further object of the invention is to provide an extensible linkage which provides one straight smooth side when it is extended and which preferably locks into a rigid structure in extended position.

The above and other objects and advantages of the invention will be more readily apparent from the following description when read in connection with the accompanying drawings, in which:

Figure 1 is a diagrammatic sectional view illustrating the installation of an aerial pickup apparatus in an aircraft;

Figure 2 is a section on the line 2—2 of Figure 1;

Figure 3 is a partial enlarged section on the line 3—3 of Figure 1;

Figure 4 is an enlarged side view of a portion of the extensible linkage;

Figure 5 is a section on the line 5—5 of Figure 4; and

Figure 6 is an end elevation on the line 6—6 of Figure 4.

The mechanism of the present invention is adapted to be mounted in an aircraft for picking up loads from the ground during flight and is illustrated in Figures 1 and 2 as mounted in one side of an airplane, the structure of which is indicated generally at 10. The airplane is formed in its lower surface with an opening which may be closed by doors 11 such as the usual bomb bay doors in a bombing plane.

The aircraft is adapted to carry a reel 12 on which a cable 13 is wound, the cable being connected to a hook 13' which is adapted to engage a loop or the like connected to the load to be picked up. Unreeling of the cable from the drum during the pickup operation may be controlled by a hydraulic mechanism indicated generally at 14 and it may be of the type more particularly claimed and disclosed in our copending application, Serial No. 515,000, filed December 20, 1943. Cable is adapted to be rewound on the reel by rewind motors 15 connected to the reel through suitable gearing, not shown.

The cable is adapted to be guided by a guide structure movable into and out of the plane and slidably supported on fixed guides 16 mounted in the plane adjacent the rearward end of the opening. A head 17 is slidably mounted in the guides 16 for vertical movement under the control of a screw 18 having a hand crank 19 at the upper end thereof. By adjustment of the screw, the head 17 can be moved up to move the entire cable guide structure into the aircraft as shown in Figure 2, or can be moved down to its operating position shown in Figure 1, in which it projects below the aircraft.

The head 17 carries a vertical guide roller 21 which is grooved as shown to receive the cable to guide it vertically. Spaced forwardly from the vertical guide roller, the head 17 carries a channel shaped portion 22 within which is rotatably mounted on a fixed axis a horizontal grooved guide roller 23. A cooperating grooved roller 24 is mounted opposite the roller 23 and is carried by a channel shaped frame 25 pivoted at 26 to the head. This frame is adapted to be swung about the pivot to open the space between the rollers for threading the cable and for winding the hook into the plane as will be explained hereinafter.

In order to hold the cable on the rollers, the head carries a pair of forwardly projecting rods 27 on which a locking carriage 28 is slidably mounted. The locking carriage is formed with a cross bar 29 adapted to underlie the vertical roller 21 in the locking position of the carriage so that the cable will be prevented from coming out of the roller. The rollers 23 and 24 in their operating position as shown in Figure 3 are spaced closely enough together that the cable cannot come out between their flanges. To hold them in this position the lower part of the frame 25 is formed with projections adapted to interfit with similar projections on the channel 22 and which are drilled to receive a locking pin 31. The pin 31 is carried by a lug 32 on the frame 28 and when the frame is in its operating position as shown in Figure 1, the pin locks the channel 25 against movement about its pivot 26.

For threading a cable through the guide rollers the carriage 28 may be moved forwardly on the rods 27 to withdraw the pin 31 from the channel 25 and to move the bar 29 out of register with the roller 21. At this time the channel 25 can be swung about its pivot 26 to open the space between the rollers. The cable can then be threaded between the rollers 23 and 24 and under the roller 21. When the locking carriage is again moved to its operating position as shown in Figure 1, the cable will be held in place on the rollers.

The hook 13' is adapted to be carried during a pickup operation by an extensible linkage which can be projected below the aircraft to bring the hook in proper position for engagement with a loop connected to a load on the ground. The linkage as shown comprises a pair of elongated guide channels 35 joined by the yoke pieces 35' to form the frame structure. This frame structure is pivotally mounted at 34 in a supporting frame 33 which is attached to the plane structure. The frame can be adjusted about its pivot 34 and held in adjusted position by a slotted bracket 36 fixedly carried in the aircraft and engaged by a locking bolt 37 on the frame. When the bolt 37 is loosened, the frame may be swung to any desired angular position within the limits of the mechanism and may be locked securely in place by tightening the bolt 37. An extensible pantograph linkage is carried by the frame and is formed as shown in detail in Figures 4 to 6. The linkage is made up of a series of central links 38 which may be castings or the like and which are preferably hollow for lightness. The links 38 are formed with a straight side 39 recessed at one end as shown at 40 to receive the end of the next adjacent link. One end of each link 38 at which the recess 40 is formed is relatively wide so that the links have a generally triangular outline.

Side links 41 are pivoted intermediate their ends to the centers of the center links by cross pivot pins 42. The side links may be straight relatively narrow members of the same length as the center links. One end of each side link is pivoted to the small end of the center link of the next pair as shown at 43 and the opposite end of the side links are pivoted to the wide end of the center link of the next pair at 44.

The linkage is guided and supported in the frame by rollers 45 rotatably carried by the pivot pins 42 and adapted to fit into the channels 35. When the linkage is retracted as shown in Figure 1, it will be supported throughout its entire length by the channels and when it is extended the channels will receive and support the rollers on the first several pairs of links so that the linkage is rigidly guided and supported.

At the outer end of the linkage an end link 46 is provided connected to the next adjacent center link by short side links 47. At its end the link 46 is formed with a key slot 48 into which the hook is adapted slidably to fit. Preferably, a spring retainer 49 is carried by the end link yieldingly to hold the hook in place thereon.

It will be noted that when the linkage is extended as shown in Figure 4, the small ends of the center links 38 fit into the recess 40 in the next adjacent center links. Thus the straight sides 39 of the several center links are aligned and present a smooth straight surface on the lower side of the linkage. This is highly desirable in a pickup operation since it permits the loop connected to the load to slide readily over the linkage until it engages the hook. At the same time, this construction insures that the linkage will be substantially rigid when in its fully extended position.

In operating the mechanism to pick up a load from the ground, the cable is first threaded through the guide rollers and the hook is then attached to the end link 46 with the linkage in its retracted position. The head 17 may be then extended below the aircraft through the opening in the bottom thereof and the linkage is then extended to project the hook to a position below the aircraft. For this purpose a cross shaft 51 is rotatably and slidably mounted at its center on the frame 35 and is threaded.

Threaded collar 52 is threaded on the upper end of the shaft 51 and collar 52' is rotatable on its lower end. The collars are pivoted to the ends of the upper most links. The shaft 51 may be turned by a crank 53 to move the collars 52 together to extend the linkage.

When the hook engages a loop or the like connected to a load on the ground it will be pulled from the end link 46 to connect the aircraft to the load through the cable 13. When this operation is completed the linkage may be retracted by turning the crank 53 to operate the collars 52. After the cable has been brought to a stop by operation of the brake mechanism 14, the load may be towed as desired.

Upon release of the load, the rewind motors 15 are operated to rewind the cable into the plane. As the re-winding continues the hook 14 will eventually reach the guide mechanism and will engage the cross bar 29 to slide the locking carriage 28 forwardly on the rods 27. This will permit the hook to pass under the roller 21, releasing the cable therefrom. As the hook reaches the horizontal rollers 23 and 24 the channel 25 will pivot upwardly to release the cable from these rollers since the locking pin 31 was withdrawn by movement of the carriage. During the re-wind operation, therefore, the locking carriage is automatically released to permit complete re-winding of the cable into the plane.

While one embodiment of the invention is shown and described in detail herein, it is understood that this is illustrative only and is not to be taken as a definition of the scope of the invention, reference being had for this purpose to the appended claims.

What is claimed is:

1. In an aerial pickup device adapted to be mounted in an aircraft, vertical guide members to be mounted in the aircraft above an opening therein, a head slidably carried by the guide members, means for adjusting the head vertically on the guide members, guide rollers carried by the head to receive and guide a tow cable, and a locking carriage slidable on the head to one position in which it holds the cable on one of the rollers and to another position in which it releases the cable from said one of the rollers.

2. In an aerial pickup device adapted to be mounted in an aircraft, vertical guide members to be mounted in the aircraft above an opening therein, a head slidably carried by the guide members, means for adjusting the head vertically on the guide members, a horizontal guide roller and a vertical guide roller rotatable on fixed axes on the head, a second horizontal guide roller carried by a frame pivoted on the head and cooperating with the first horizontal roller to hold the cable between them, and releasable locking means to hold the frame in operative position.

3. In an aerial pickup device adapted to be mounted in an aircraft, vertical guide members to be mounted in the aircraft above an opening therein, a head slidably carried by the guide members, means for adjusting the head vertically on the guide members, a horizontal guide roller and a vertical guide roller rotatable on fixed axes on the head, a second horizontal guide roller carried by a frame pivoted on the head and cooperating with the first horizontal roller to hold the cable between them, a locking carriage slidable on the head having a part cooperating with the vertical roller to hold the cable thereon, and locking means carried by the carriage cooperating with the frame to hold it in operating position.

4. In an aerial pickup device adapted to be mounted in an aircraft, vertical guide members to be mounted in the aircraft above an opening therein, a head slidably carried by the guide members, means for adjusting the head vertically on the guide members, a horizontal guide roller and a vertical guide roller rotatable on fixed axes on the head, a second horizontal guide roller carried by a frame pivoted on the head and cooperating with the first horizontal roller to hold the cable between them, a pair of supporting bars extending forward from the head, a locking carriage slidable on the bars for movement to a locking position adjacent the rollers and to a release position remote from the rollers, locking means carried by the carriage cooperating with the frame to hold it in operative position when the carriage is in its locking position, the carriage being formed to engage a hook on the cable whereby the hook will slide the carriage to its release position as the cable and hook are moved toward the aircraft.

5. In an aerial pickup device adapted to be mounted in an aircraft, a pantograph linkage mounted at one end in the aircraft and extensible through an opening in the aircraft, means to control the extension and contraction of the linkage, a hook detachably carried by the other end of the linkage, a cable connected to the hook, and guide means for the cable including a head, means mounting the head in the aircraft for vertical movement to an extended position projecting out of the aircraft or a retracted position within the aircraft, and guide rollers carried by the head to receive and guide the cable.

6. In an aerial pickup device adapted to be mounted in an aircraft, a pantograph linkage mounted at one end in the aircraft and extensible through an opening in the aircraft, means to control the extension and contraction of the linkage, a hook detachably carried by the other end of the linkage, a cable connected to the hook, and guide means for the cable including a head, means mounting the head in the aircraft for vertical movement to an extended position projecting out of the aircraft or a retracted position within the aircraft, the head being mounted at one side of the linkage so that the head and linkage can be moved without interference with each other, horizontal and vertical guide rollers carried by the head to receive and guide the cable, and a locking carriage movably mounted on the head and cooperating with the guide rollers to hold the cable thereon, the carriage being formed to engage the hook when cable is being drawn into the aircraft so that the hook will move the carriage to a position to release the cable.

7. In an aerial pickup device, an elongated guide channel adapted to be mounted in an aircraft, a pantograph linkage including pairs of links pivoted together at their centers and pivotally interconnected at their ends to links of other pairs, one link of each pair being generally triangular with its ends formed to interfit with like links of adjacent pairs to lock the linkage in extended position, and rollers carried by the links adjacent the central pivotal connection of the pairs to fit in the guide channel.

8. In an aerial pickup device, an elongated guide channel adapted to be mounted in an aircraft, a pantograph linkage including pairs of links pivoted together at their centers and pivotally interconnected at their ends to links of other pairs, one link of each pair having a straight side and a sloping side to form a generally triangular shape, the straight side of said one link of each pair being formed with an offset at its wider end to receive the narrower end of the like link of an adjacent pair whereby when the links are extended they will have one straight smooth side, and rollers carried by the central pivots of the pairs of links to fit in the guide channels.

9. In an aerial pickup device, an extensible linkage comprising center links of generally triangular shape with the wider end of each link recessed to receive the smaller end of the next adjacent center link so that a straight substantially smooth surface will be provided when the links are in extended position, and side links overlying the center links and pivoted at their centers to the centers of the center links to form cooperating pairs of links, the ends of the links of each pair being pivotally connected to the ends of the links of adjacent pairs.

10. In an aerial pickup device, a frame adapted to be mounted in an aircraft, a pantograph linkage carried by the frame including pairs of links pivoted together at their centers and pivotally interconnected at their ends to links of other pairs, one link of each pair being generally triangular with its ends formed to interfit with like links of adjacent pairs to provide a substantially smooth straight surface when the linkage is extended, and means on the frame to control extension and contraction of the linkage.

11. A pantograph linkage for use in an aerial pickup device comprising pairs of links pivoted together at their centers and pivotally interconnected at their ends to the links of adjacent pairs, one link of each pair being generally triangular with its ends formed to interfit with like links of adjacent pairs to lock the linkage in extended position and to provide a substantially straight smooth surface when the linkage is extended.

REXFORD O. ANDERSON.
WILLIAM E. WALSH.